Nov. 29, 1932.   J. BOERLAGE   1,889,591
RECIPROCATING PISTON LUBRICATION FOR PUMPS

Filed Oct. 23, 1930

Patented Nov. 29, 1932

1,889,591

UNITED STATES PATENT OFFICE

JOHANN BOERLAGE, OF WIESBADEN, GERMANY

RECIPROCATING PISTON LUBRICATION FOR PUMPS

Application filed October 23, 1930, Serial No. 490,656, and in Germany July 11, 1929.

This invention relates to an air pump for producing under pressure and over pressure for medical and cosmetic purposes.

In such pumps it is known to connect the piston parts with felt rings or similar wick-like elements, saturated with grease so that a lubrication of the cylinder is obtained in this manner. The objection to this arrangement consists in that by the supporting of the piston parts on the opposite sides and their fixation on the piston rod, the felt ring cannot be subjected to pressure during the reciprocating movement of the piston, in order to give up lubricant in radial direction.

According to the invention the ring parts of the piston, which cover on both sides the intermediate wick element saturated with lubricant, are arranged axially movable relative to the piston rod so that, when the pump is working, the wick element is subjected to axial pressure alternately from both sides and compelled to give up lubricant in radial direction.

A disc of hard material, such as metal is preferably interposed between each of the two cup-shaped ring parts and the adjacent surface of the wick element in order to render uniform the specific surface pressure at each pumping stroke.

An embodiment of the invention is illustrated by way of example in the accompanying drawing in which.

Figure 1:
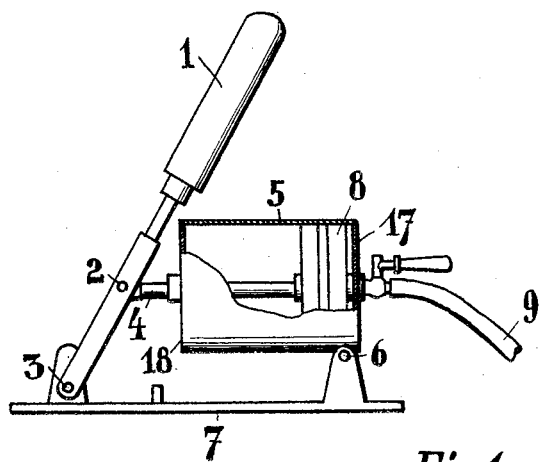
Fig. 1 shows the air pump in side elevation, partly in section.
Figure 2:
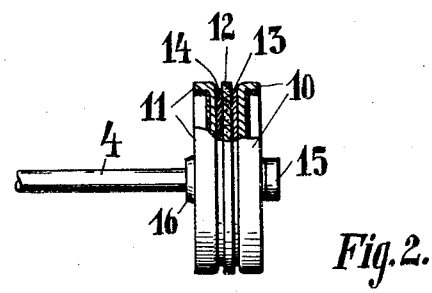
Fig. 2 shows the piston in side elevation partly in section.
Figure 3:
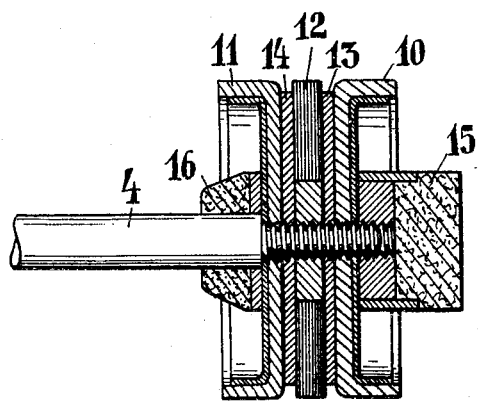
Fig. 3 is a section through the piston on enlarged scale.

In the drawing 1 is the handle of an oscillatable lever, pivoted by a pivot pin 3 and connected by a bolt 2 to the piston rod 4 of the air pump. The cylinder 5 is also oscillatable around a pivot pin 6. The pivot pins 6 and 3 are fixed on a common base plate 7. The piston rod 4 carries a piston 8. By a suitable valve arrangement it is possible to produce impulse like underpressure and overpressure through a tube 9, on the end of which a cup, open towards the bottom, is arranged, which can be placed on the skin or on cavities of the body. The air pump can be constructed in various manners.

The invention relates to the piston 8, which consists of two cups 10 and 11, which, for example, may be of leather. Between these cups 10 and 11 a wick element, for example a felt ring 12, is enclosed, which is steeped in pure oil, vaseline or the like. Between this wick element 12 and the two cups 10 and 11 two metal rings 13 and 14 are arranged. These metal rings are mounted axially shiftable on the piston rod 4. A felt pad 15 may be arranged on the end face of the piston, whereas a felt ring 16 is preferably arranged on the opposite side of the piston.

The operation is as follows:

On the piston 8 being reciprocated by means of the hand lever 1 or by mechanical drive, the piston body is continually moved to and fro between the cylinder covers 17 and 18, so that the compression causes an axial displacement of the corresponding leather cup 10 or 11 and thereby a pressure upon the felt ring 12, the lubricant of which being thereby distributed and pressed against the cylinder wall. Through the arrangement of felt pads on the cup 10 the shock caused by impact on the cylinder cover 17 is transmitted through the felt pad 15 to the cup 10, thence to the metal ring 13 and from this ring to the wick element 12 which consequently delivers a small quantity of very finely divided lubricant in the direction towards the pump cylinder 5. On moving in the opposite direction the felt ring 16 strikes against the cylinder cover 18, which also transmits the shock to the wick element 12 through the leather cup 11 and the metal ring 14, so that a quantity of lubricant is also forced out in the direction towards the pump cylinder 5 during this movement.

I claim:

1. An air pump for producing underpressure and overpressure for medical and cosmetic purposes, comprising in combination with the piston rod, leather cups forming the piston shiftable in an axial direction on said piston rod, a wick element such as a felt ring saturated with lubricant between said cups, the pressure impacts, occurring from both sides during the working of the pump, exerting an axial pressure on said wick element and causing said wick element to give up lubricant in radial direction.

2. An air pump as specified in claim 1, comprising in combination with the leather cups of the piston the wick element saturated with lubricant arranged between said leather cups and the cylinder covers, felt pads on said leather cups adapted at each stroke of said piston to strike against one of said cylinder covers and to exert a feeding pressure on said wick element.

3. An air pump as specified in claim 1, comprising in combination with the leather cups and the wick element between said cups, discs of hard material such as metal, each disc arranged between one end of said wick element and the corresponding cup, adapted to reduce and equalize the specific surface pressure at each pump stroke.

In testimony whereof I affix my signature.

JOHANN BOERLAGE.